H. S. COLE.
FOLDING AUTOMOBILE BED.
APPLICATION FILED JAN. 5, 1916.
1,233,645.
Patented July 17, 1917.
Fig. 1
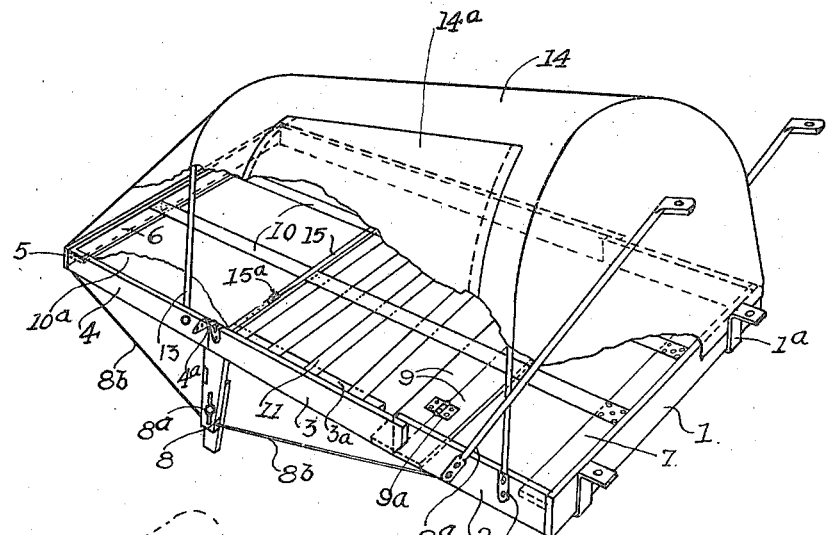
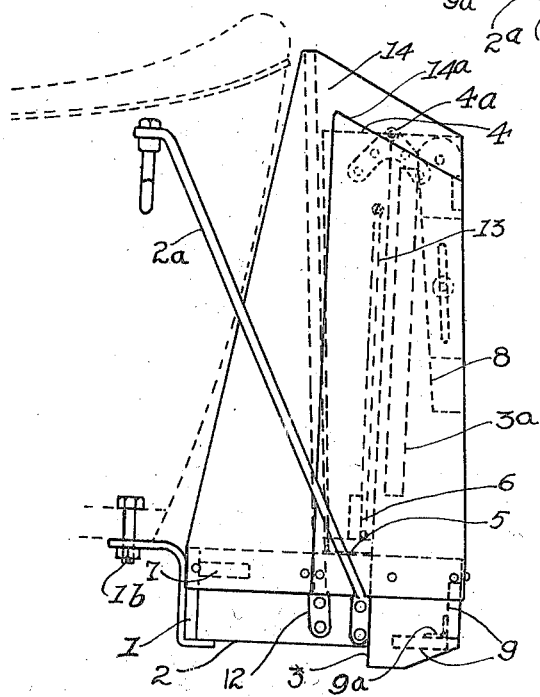
Fig. 2
Inventor
Herrick S. Cole.
By A. B. Bowman
Attorney.

UNITED STATES PATENT OFFICE.

HERRICK S. COLE, OF OCEAN BEACH, CALIFORNIA.

FOLDING AUTOMOBILE-BED.

1,233,645.   Specification of Letters Patent.   Patented July 17, 1917.

Application filed January 5, 1916. Serial No. 70,417.

*To all whom it may concern:*

Be it known that I, HERRICK S. COLE, a citizen of the United States, residing at Ocean Beach, in the county of San Diego and State of California, have invented certain new and useful Improvements in Folding Automobile-Beds, of which the following is a specification.

My invention relates to a folding bed which is adapted to be attached to the rear of an automobile to be used for traveling or camping purposes, and the objects of my invention are: first, to provide a bed of this class which may be folded into a very compact form, and which when unfolded provides a full sized bed for use; second, to provide a bed of this class which combines strength and durability with economy of weight; third, to provide a bed of this class which may be inclosed in case of storms while the bed is in use, and fourth, to provide a bed of this class which is simple and economical of construction, easily operated and will not readily get out of order.

With these and other objects in view as will appear hereinafter, my invention consists of certain novel features of construction, combination and arrangement of parts as will be hereinafter described in detail and particularly set forth in the appended claim, reference being had to the accompanying drawings and to the characters of reference thereon which form a part of this specification, in which:

Figure 1 is a perspective view of the bed complete in position for use, shown detached from the automobile and Fig. 2 is a side elevational view of the same in its folded position, shown mounted on the rear of the automobile.

Similar characters of reference refer to similar parts throughout the several views.

The front support 1, front side pieces 2, intermediate side pieces 3, rear side pieces 4, rear end piece 5, rear end bed support 6, front end bed support 7, adjustable leg supports 8, hinge supports 9, longitudinal straps 10, transverse straps 11, front bow 12, rear bow 13 and canvas cover 14 constitute the principal parts of my folding automobile bed.

The front support 1 is provided with brackets 1ª adapted to fit under the body of the automobile and be attached to the frame by means of bolts 1ᵇ. At each end of this support 1 is secured the side pieces 2 and between these side pieces 2 is secured the front end bed support 7 against the inner surface of the support 1. Rigidly secured to these side pieces 2 are the braces 2ª which extend upwardly and the upper ends are secured to the top brackets of the automobile as shown best in Fig. 2 of the drawings. Also rigidly mounted on these side pieces 2 is the front bow 12 which supports the front end of the top 14. Mounted on the lower edge near the extended ends of said side pieces 2 is a hinged piece 9, and adjacent it is another hinged piece 9 secured to the front lower edges of the intermediate side pieces 3 and these pieces 9 are hinged together by means of the hinges 9ª so that the intermediate piece 3 is pivotally connected to the front pieces 2 by means of the hinges 9ª and the hinge supports 9. Mounted on the inner sides of the intermediate side pieces 3 are cleats 3ª which are adapted to support the transverse straps 11, the ends of said straps being rigidly secured between the intermediate side pieces 3 and the cleats 3ª. Pivotally mounted near the rear end of said intermediate pieces 3 are the adjustable leg supports 8 which are made in two sections and held in certain relative positions to each other by means of the bolts 8ª. These leg supports are also reinforced by means of tension braces 8ᵇ extending to the front and rear side pieces. The one extending to the rear side pieces is hooked so that it may be readily detached so that the support will fold up as shown in Fig. 2 of the drawings. To the intermediate side pieces 3 are pivotally connected the rear side pieces 4 by means of hinges 4ª so that the rear side piece 4 will fold upon the intermediate side pieces 3. These rear side pieces 4 are connected together at their extended ends by means of the rear end piece 5. Mounted between these rear side pieces 4 and against the rear end piece 5 is the rear end bed support 6 upon which the rear ends of the longitudinal straps 10 are secured and the front ends are secured to the front end bed support 7. Over these straps 10 and 11 is stretched a canvas 10ª for the support of the bed. Pivotally mounted on the rear side pieces 4 is the bow 13 near the hinges 4ª. This bow may be readily folded down between the side pieces 4 after partially folding the side pieces 4 relatively to the side pieces 3. Over these bows 12 and 13 and secured to the front support 1 and sides 2 and buttoned to the other side pieces and rear end piece is stretched the cover 14 which is provided in the sides with a loose flap 14ª which may be opened for ventilation. Mounted on the side pieces is a strap 15 provided with a buckle 15ª adapted to hold the folded bed clothing in position when the bed frame is folded up as shown in Fig. 2 of the drawing.

Though I have shown and described a particular construction, combination and arrangement of parts, I do not wish to be limited to this particular construction, combination and arrangement, but desire to include in the purview of my invention the construction, combination and arrangement substantially as set forth in the appended claim.

It is obvious that with this construction there is provided a bed frame which may be readily attached to the rear end of an automobile which is foldable in three sections, a short section of which remains horizontal and rigid with the automobile frame and second and third sections folding together and folding into a nearly vertical position against the back of the automobile that the supporting legs 8 will fold against the frame as shown in Fig. 2; that the device is simple and economical of construction, durable, easily operated and very compact in form when folded for traveling, that the various longitudinal and transverse straps when stretched out by unfolding the several sections will prevent sagging of the bed in the center thus providing a comfortable bed.

Having thus described my invention what I claim as new and desire to secure by Letters Patent, is:

In a folding automobile bed, the combination of a rigid stationary bed section secured to the rear frame of an automobile, an intermediate bed section foldable relatively thereto and a rear end bed section foldable against said intermediate bed section.

In testimony whereof, I have hereunto set my hand at San Diego, California, this 24th day of December 1915.

HERRICK S. COLE.